US011867396B2

(12) United States Patent
Happe

(10) Patent No.: US 11,867,396 B2
(45) Date of Patent: Jan. 9, 2024

(54) DEVICE FOR INDICATING THE STATUS OF A GAS BURNER

(71) Applicant: Mertik Maxitrol GmbH & Co. KG, Thale (DE)

(72) Inventor: Barbara Happe, Quedlinburg ot Gernrode (DE)

(73) Assignee: MAXITROL GMBH CO. KG

( * ) Notice: Subject to any disclaimer, the term of this patent is extended or adjusted under 35 U.S.C. 154(b) by 331 days.

(21) Appl. No.: 16/975,923

(22) PCT Filed: Feb. 13, 2019

(86) PCT No.: PCT/EP2019/000039
§ 371 (c)(1),
(2) Date: Aug. 26, 2020

(87) PCT Pub. No.: WO2019/166124
PCT Pub. Date: Sep. 6, 2019

(65) Prior Publication Data

US 2020/0400311 A1 Dec. 24, 2020

(30) Foreign Application Priority Data

Feb. 27, 2018 (DE) ..................... 10 2018 001 539.5

(51) Int. Cl.
*F23N 1/00* (2006.01)
*H01H 35/34* (2006.01)

(52) U.S. Cl.
CPC ........... *F23N 1/007* (2013.01); *H01H 35/346* (2013.01); *F23N 2235/20* (2020.01); *F23N 2241/08* (2020.01); *F23N 2900/05005* (2013.01)

(58) Field of Classification Search
CPC .. F23N 1/007; F23N 2241/08; F23N 2235/20; F23N 2900/05005; H01H 35/346
(Continued)

(56) References Cited

U.S. PATENT DOCUMENTS 4,695,052 A * 9/1987 Berkhof .............. F24D 19/1048 236/94
5,367,878 A * 11/1994 Muntz ....................... F15C 1/04 60/512
(Continued)

FOREIGN PATENT DOCUMENTS

DE 10 2006 034 868 A1 2/2007
DE 10 2009 011 611 A1 9/2010

OTHER PUBLICATIONS

English language abstract and machine-assisted English language translation of German Patent document DE 10 2006 034 868 A1 extracted from www.espacenet.com database on Aug. 10, 2020, 7 pages.
(Continued)

*Primary Examiner* — Avinash A Savani
(74) *Attorney, Agent, or Firm* — McDonald Hopkins LLC

(57) ABSTRACT

The aim of the invention is to create a device for indicating the status of a gas burner, which device functions independently of the circumstances of the specific gas burner design and arrangement. This aim is achieved, according to the invention, in that the device (1), which is connected to an outlet (**7*a*) of the gas control apparatus (4) for the gas burner (2), consists of a housing (14), which has at least two chambers connected to each other, which are separated gas-tight by a membrane (16) connected on one side to an electrically conductive component (15), wherein: the chamber A (17) is connected to the gas outlet (7*a*) of the gas control apparatus (4); the membrane (16), to which the gas pressure of the gas burner (2) is applied through an opening (18) in the chamber A (17) when the gas valve is open, produces a stroke; by means of the stroke, the chamber B (19), in which the side of the membrane (16) having the connected electrically conductive component (15) is positioned, closes a circuit (20) via contact elements (10**) led
(Continued)

outward and suitably (12) indicates the operating status. The device for indicating the status of a gas burner can be used in the case of gas-operated heating apparatuses having gas control apparatuses having a liquid-filled temperature controller.

8 Claims, 6 Drawing Sheets

(58) Field of Classification Search
USPC ........................................................ 431/13
See application file for complete search history.

(56) References Cited

U.S. PATENT DOCUMENTS

| | | | |
|---|---|---|---|
| 9,151,497 | B2 | 10/2015 | Happe et al. |
| 2014/0096850 | A1 | 4/2014 | Filkovski et al. |

OTHER PUBLICATIONS

Translated International Search Report relating to International Patent Application No. PCT/EP2019/000039 dated Apr. 8, 2019; 2 pages.

* cited by examiner

D–D

DEVICE FOR INDICATING THE STATUS OF A GAS BURNER

CROSS-REFERENCE TO RELATED APPLICATIONS

This application is the National Stage Patent Application of International Patent Application No. PCT/EP2019/000039, filed Feb. 13, 2019, which claims priority to and all the advantages of German Patent Application No. 10 2018 001 539.5, filed Feb. 27, 2018, the entire contents of which are hereby incorporated by reference.

TECHNICAL FIELD

The invention relates to a device for indicating the status of a gas burner when it is operated with a gas control apparatus with a liquid-filled temperature controller.

BACKGROUND

It is desirable for the operating status of gas-fired kitchen equipment to be indicated to enable the operator to determine whether the pre-set operating temperature has been reached, that is whether the deep fryer can be re-loaded for example. Nowadays, electrical appliances are fitted as standard with an LED to indicate that the pre-set operating temperature has been reached and that the heating element is switched off. In the case of gas appliances this indication is as yet available only on those appliances that operate with an electronic temperature control. The one crucial disadvantage of gas appliances with an electronic temperature control, apart from higher costs, is that they cannot be used during a power outage. Gas control apparatuses with a liquid-filled temperature controller are used to enable gas appliances to be operated more economically, as well as independently of the electricity supply.

Unlike gas control apparatuses with electronic temperature control, the actual temperature cannot be compared with the pre-set set point in the case of gas control apparatuses with liquid-filled temperature controllers unless modifications are made. The flame of the gas burner can be used by means of temperature measurement as a signal for switching the gas burner on and off. The disadvantage of this method is that an electronics system is required to evaluate the signal. Problems are also presented by the arrangement of the sensor, especially because of the diversity of gas burner designs and arrangements.

SUMMARY

The invention addresses the problem of devising a solution for a device for indicating the status of the gas burner when using a gas control apparatus with a liquid-filled temperature controller, said solution being simple in structure, simple to manufacture and capable of functioning independently of the circumstances of the specific gas burner design and arrangement. The device is intended to be suitable both for indicating the status of the gas burner and for other indications as well, e.g. ignition gas. This device is intended to be capable of being retrofitted in existing installations.

The problem is solved according to the invention in that the device, which is connected to an outlet of the gas control apparatus for the gas burner, consists of a housing, which has at least two interconnected chambers, which are separated gas-tight by a membrane connected on one side to an electrically conductive component, wherein the chamber A is connected to the gas outlet of the gas control apparatus, the membrane, to which the gas pressure of the gas burner is applied through an opening in the chamber A when the gas valve is open, produces a stroke, by means of which the chamber B, in which the side of the membrane having the connected electrically conductive component is positioned, closes a circuit via contact elements led outwards and suitably indicates the operating status.

When the gas valve is closed, the stroke of the membrane returns to the starting position at its own spring constant. The circuit is opened and the operating status is no longer indicated.

A solution has therefore been found which eliminates the disadvantages of the prior art set out above.

Advantageous embodiments of the invention are set out in the dependent claims.

For example, a favorable embodiment of the device has proved to consist in designing chamber A of the housing differently with two connection points to serve as a status indicator for the pilot gas on connection to the pilot gas outlet in the supply line between gas control apparatus and pilot gas burner.

An additional favorable embodiment of the device consists in arranging the chamber A of the housing, which is constructed with two connection points, as a fitting in the supply line between gas control apparatus and gas burner.

Another possible embodiment consists in connecting to the contact a relay instead of a status indicator, which can in turn switch external components as a function of the membrane stroke.

A further favorable embodiment consists in the membrane having a spring constant that with sufficient stroke dispenses with the use of a separate restoring spring to open the circuit when the gas valve of the gas control apparatus is shut.

The device's simple structure and mode of operation eliminate the need for a pressure setting of the device adjusted to the installation situation.

BRIEF DESCRIPTION OF THE DRAWINGS

Exemplary embodiments of the device according to the invention are described below in more detail by means of execution examples which show the following.

DETAILED DESCRIPTION

Figure 1:
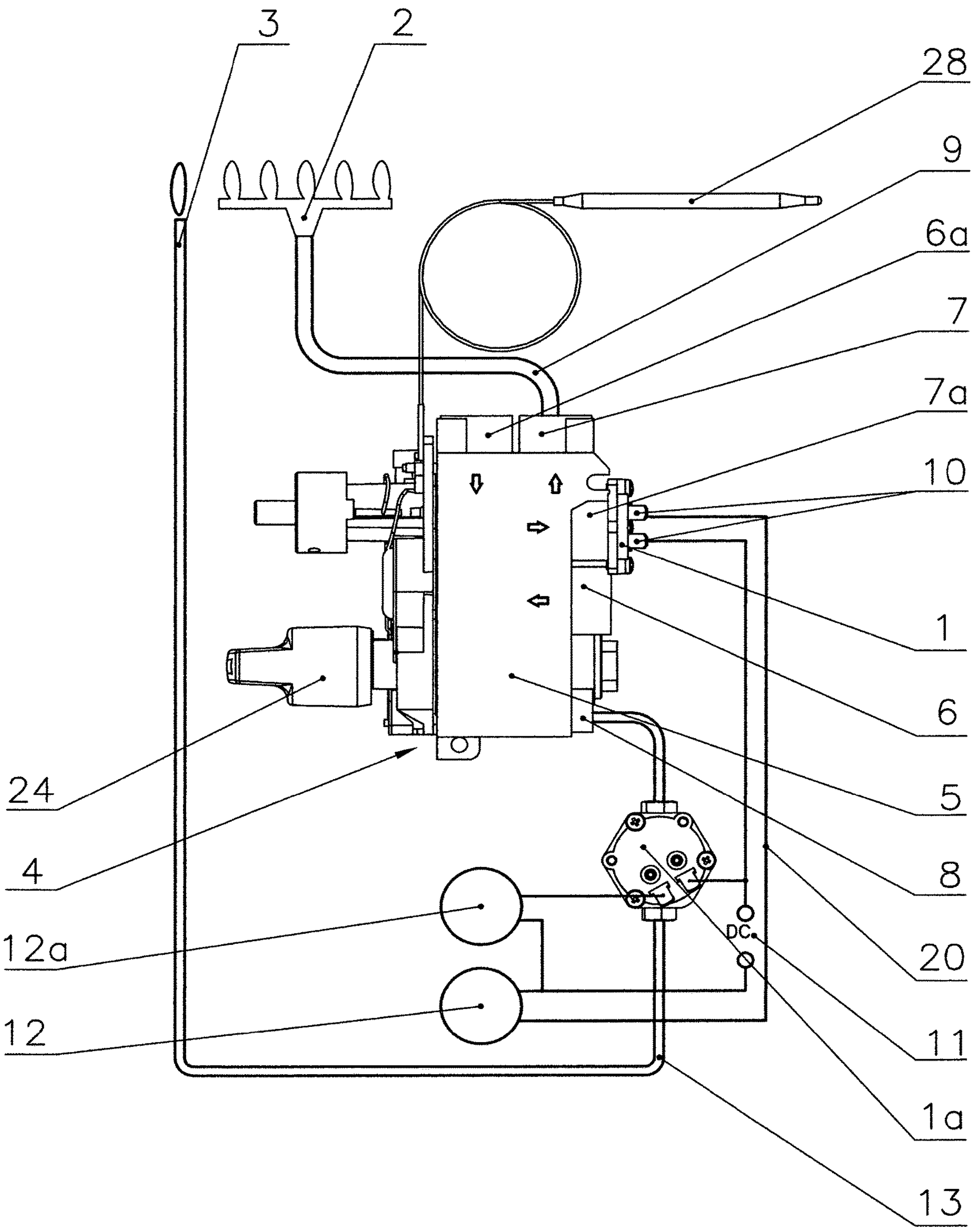
FIG. 1 is a device according to the invention fitted to the gas control apparatus as status indicators for gas burner and pilot gas burner.

FIG. 1 depicts an exemplary structure including the devices 1 and 1*a* according to the invention for indicating the status of a gas burner 2 and a pilot gas burner 3 connected to a gas control apparatus 4 with a liquid-filled temperature controller that is preferably intended for a gas-fired heating appliance or the like. The gas control apparatus 4 enables a gas burner 2 to be operated and monitored and the required temperature to be set and controlled by controlling the volume of gas flowing to the gas burner.

In this example the gas control apparatus 4 comprises a housing 5 that has gas inlets 6 and 6*a* marked with directional arrows as well as gas outlets 7 and 7*a* marked with directional arrows, and a pilot gas outlet 8. The following functional units are housed in the housing 5 looked at in the flow direction of the gas:

Start-up with safety pilot valve (not depicted); and

Control unit with a liquid-filled temperature controller for the volume of gas flowing to the main burner (not depicted).

The structure and mode of action of the gas regulating fitting are known to those skilled in the art. A more detailed depiction and explanation has therefore not been provided in this execution example.

Figure 5:
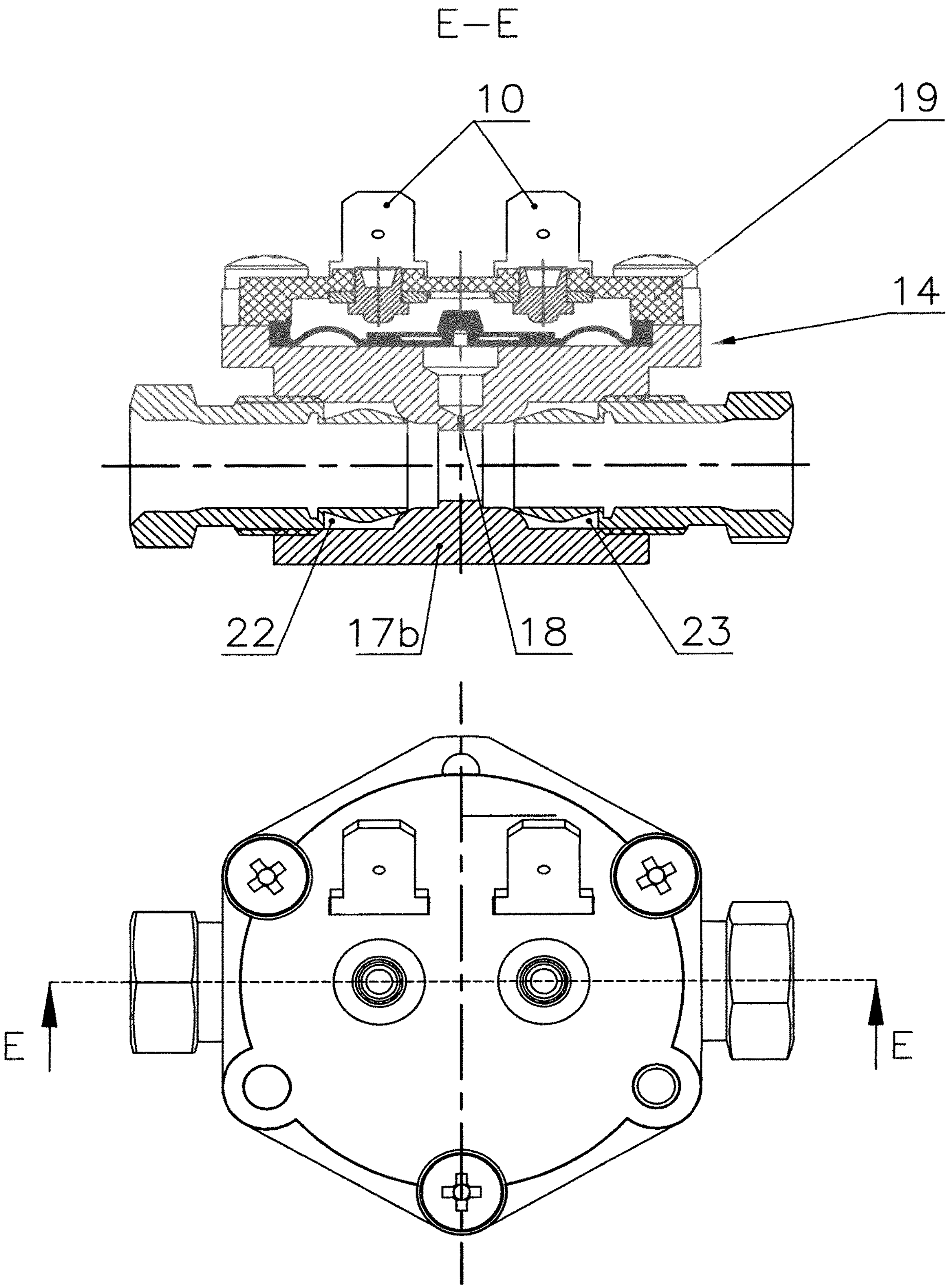
FIG. 5 is a sectional view of a device according to the invention with chamber A for gas-tight installation in a supply line to the burner.

As depicted in FIG. 1 the device 1 according to the invention is fitted gas-tight to one of the two outlets 7*a* of the gas control apparatus 4. The supply line 9 is connected to the gas burner 2 on the second gas outlet 7. The gas inlet 6 or 6*a* that is not connected to the gas network is sealed with a sealing element (not depicted), preferably a threaded plug. The electrical contact elements 10 of the device 1 are electrically connected to the voltage source 11 and the LED 12. A second modified device 1*a* according to the invention, which is depicted in FIG. 5, is installed in the pilot gas supply line 13. Its electrical contact elements 10 are electrically connected to the voltage source 11 and the LED 12*a*.

Figure 2:
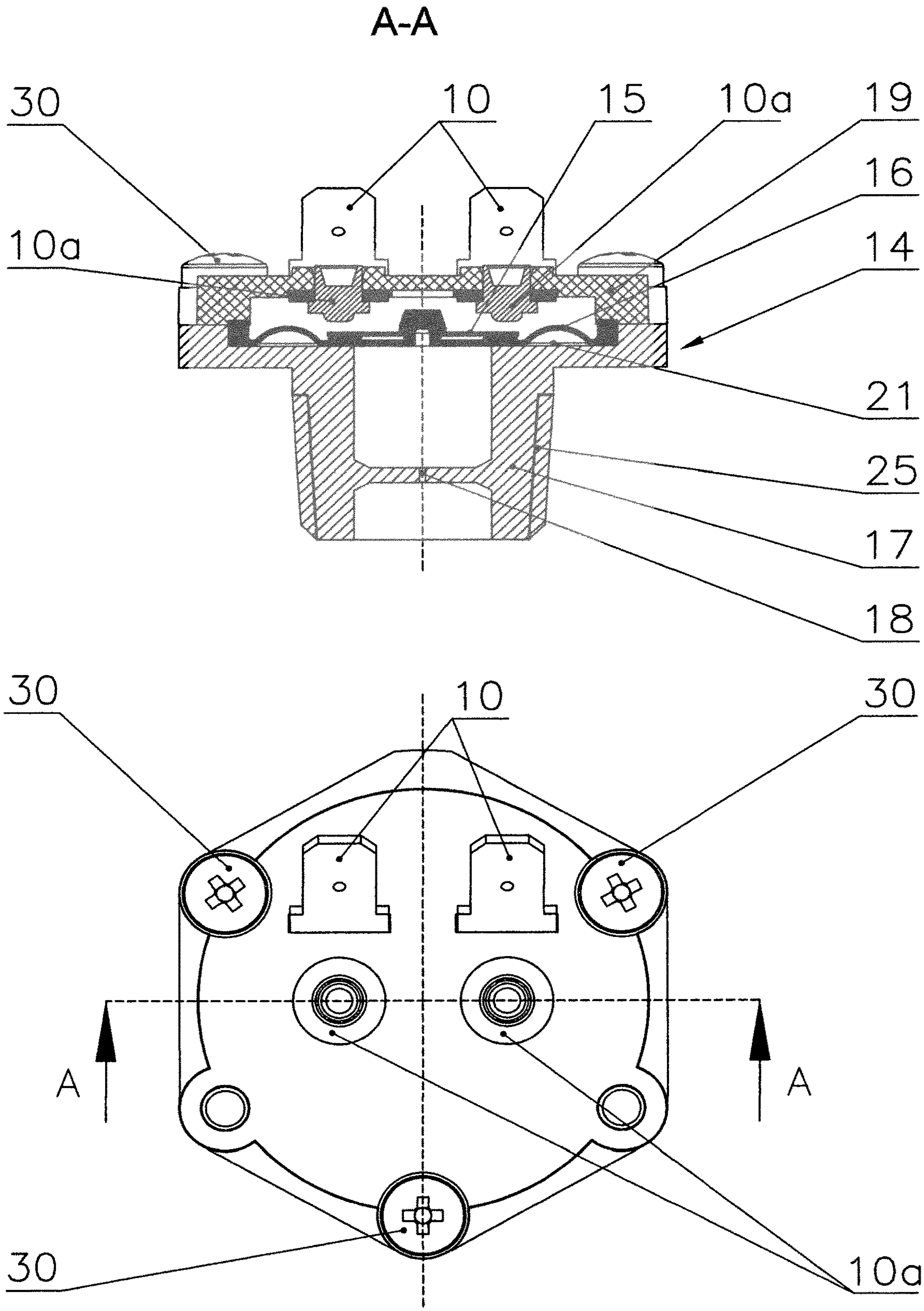
FIG. 2 is a sectional view of a device according to the invention in open position.
Figure 3:
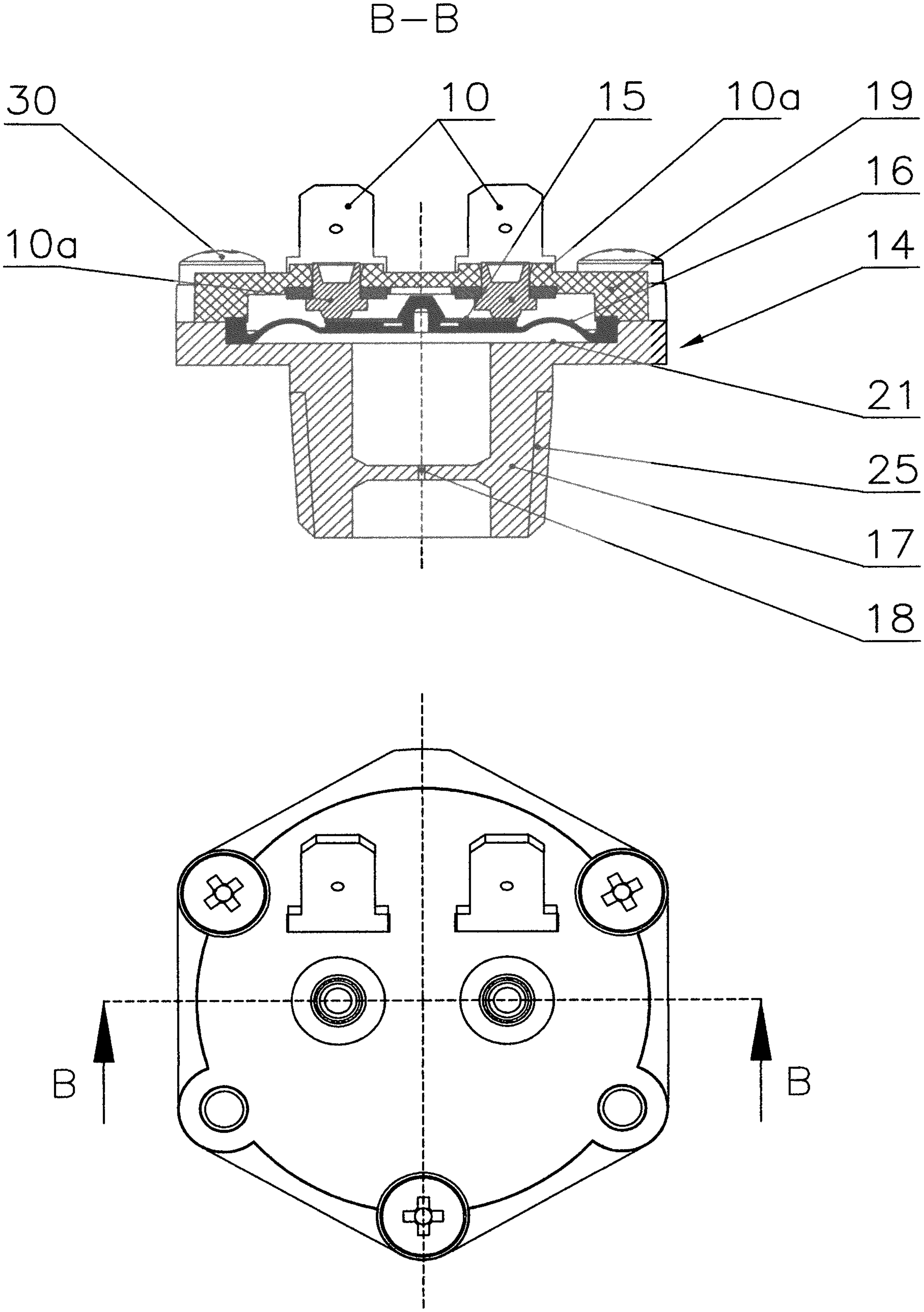
FIG. 3 is a sectional view of a device according to the invention in closed position, FIG. 4 a sectional view of a device according to the invention with chamber A for direct connection to the gas control apparatus by means of thread and sealing element.
Figure 4:
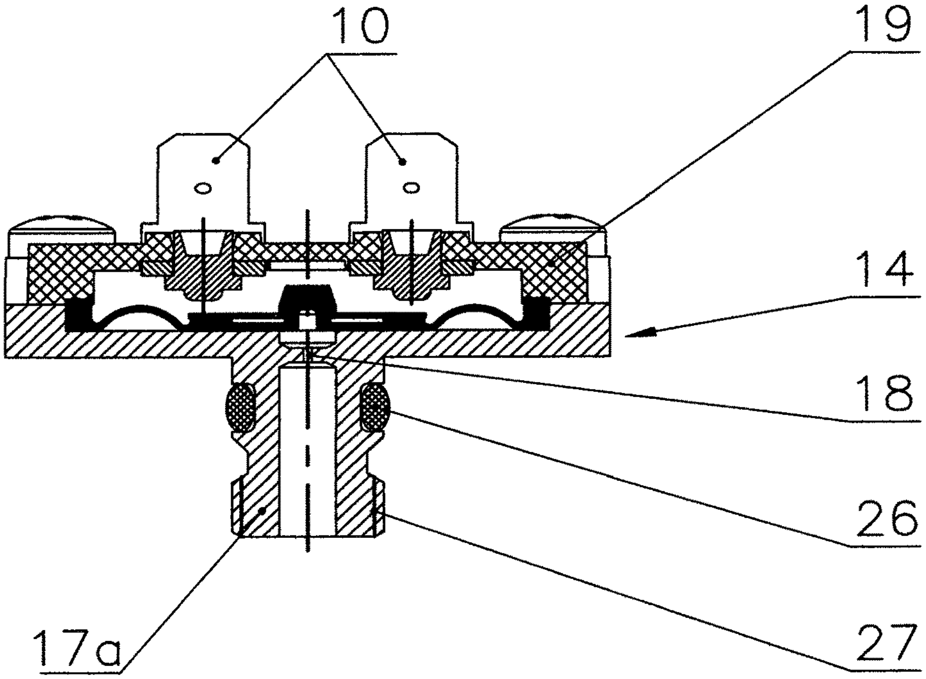
Figure 4:
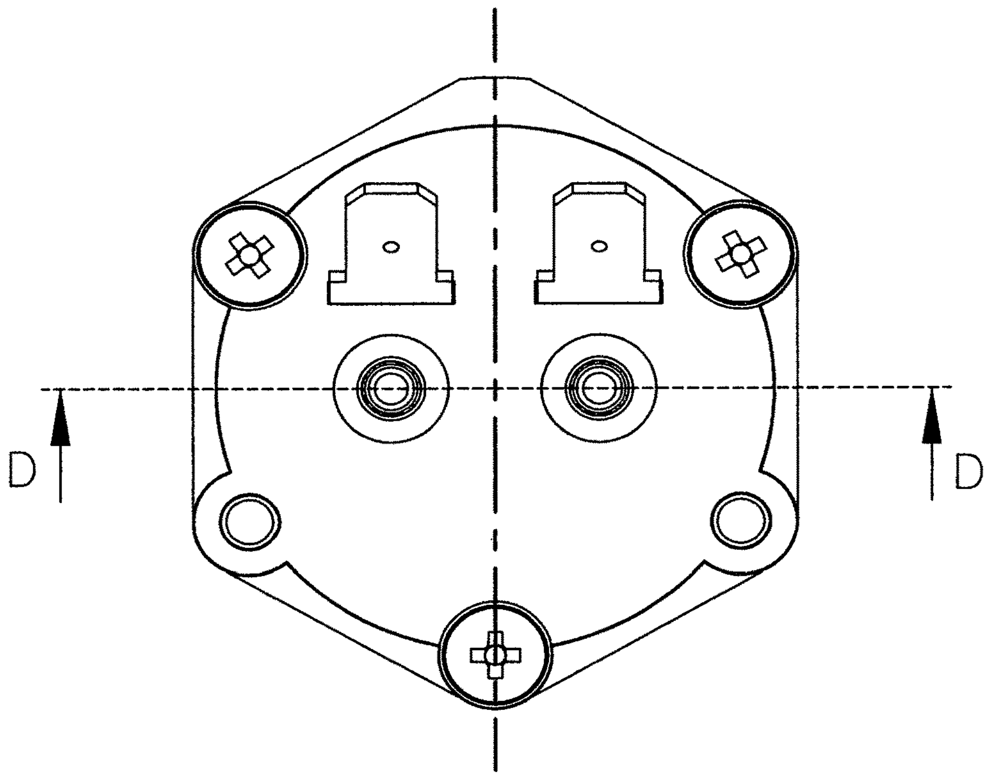

As depicted in FIG. 2 the device 1 according to the invention comprises a housing 14 with two interconnected chambers, the chamber A 17 and the chamber B 19. The chamber A 17, which for safety reasons is made of metallic material, is connected to the gas outlet 7*a* of the gas control apparatus 4, in this execution example by a gas and pressure-tight screwed connection 25 made on the threads. A screwed connection with cylindrical thread 27 and a sealing element 26, as depicted in FIG. 4, can serve as an alternative connection to the gas control apparatus by means of a modified chamber A 17*a*. Both chambers are sealed from each other by a membrane 16. The external circumferential bead of the membrane serves here as a positive sealing element. Both chambers are interconnected in this execution example by a screwed connection (30). An electrically conductive, centrally perforated disc 15 is fitted on one side of the membrane 16 by means of a snap-on fastener. The membrane with the fitted disc is positioned in the direction of the chamber B 19. The chamber B 19, which is made of non-electrically conductive material, preferably plastic, houses two contact elements 10 insulated from each other. These contact elements 10 are inserted by slits in the chamber B 19 into the interior and positioned by electrically conductive fastenings 10*a* and firmly attached in a suitable manner, in this example by shaping the fastenings. The device according to the invention depicted in FIG. 2 is shown in the open position, that is the membrane is located on the lower stop 21 because no burner pressure has been applied. The circuit 20 is open and no status indication is given. If pressure is applied to the gas burner 2 by opening the main valve in the gas control apparatus, the pressure is transferred through the opening 18 into the interior of the device 1 according to the invention on to the lower side of the membrane 16. It is advantageous here if the size of the opening 18 is such as to prevent an ignitable, impermissibly high volume of gas escaping if the membrane 16 is destroyed in the event of a breakdown. In addition, this design enables the chamber B 19 to be manufactured inexpensively from plastic. The membrane 16 moves under the pressure applied up to the upper stop formed by both electrically conductive fastenings 10*a*. The final position of the membrane 16 under the applied pressure is depicted in FIG. 3. When the membrane 16 reaches its final position, both fastenings 10*a* are electrically connected by the disc 15, the circuit 20 is closed and the status is indicated by the connected LED 12. The status is continuously indicated as long as pressure is applied to the gas burner 2. The status indicator goes out and LED 12 is off if the valve of the gas control apparatus 4 controlled by the liquid-filled temperature controller 28 closes.

The second device 1*a* according to the invention depicted in FIG. 1 and shown in detail in cross-sectional view in FIG. 5, has a chamber A 17*b* with a modified structure. This chamber A has two connection points as inlet 22 and outlet 23, designed in this case preferably as metallically sealing compression fittings, for installation in a supply line, in this example the supply line 13 to the pilot burner 3. The structure and mode of operation of the status indicator corresponds in this example as well to the device 1 according to the invention.

Unlike device 1 the status is indicated here via a second LED 12*a* as a function of the pressure on the pilot gas burner 3. On activation of the start-up 24 of the gas control apparatus 4, a safety pilot valve (not depicted) is opened and pilot gas is released to the pilot burner and ignited. As the device 1*a* is installed directly in the supply line 13, the pressure here on the pilot burner leads to the stroke movement of the membrane 16. The circuit 20 is closed in the same way as in the previous example via the fastenings 10*a* and contact elements 10. If the gas control apparatus is taken out of service, the pilot gas pressure goes to zero. The membrane 16 moves back to the lower stop 21, the circuit 20 is opened and the status indicator, LED 12*a*, goes out.

Figure 6:
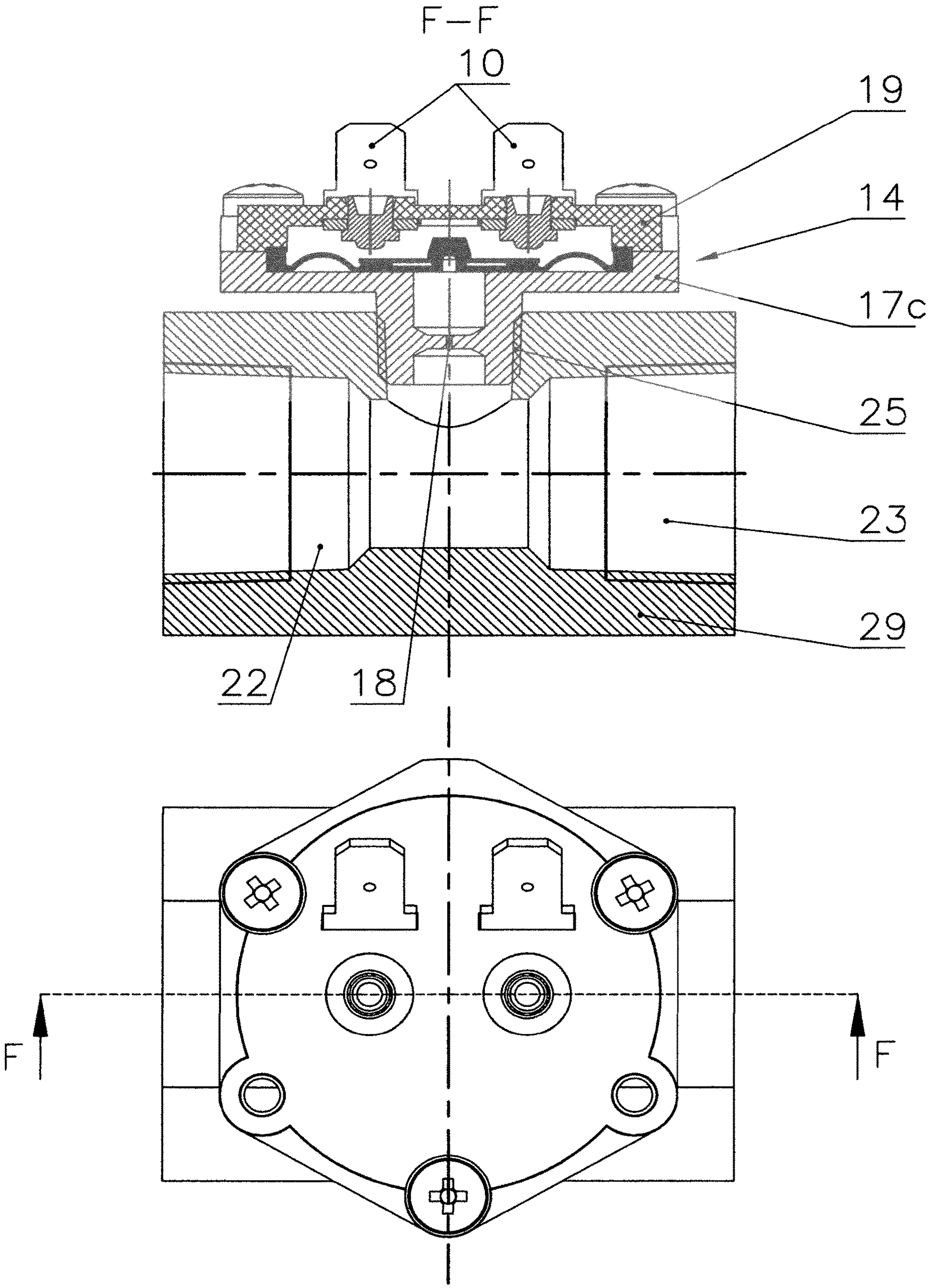
FIG. 6 is a sectional view of a device according to the invention with connection to an adaptor for gas-tight installation as a fitting in a supply line to the burner without sealing elements.

If no direct connection to a gas outlet of the gas control apparatus 4 is available for the device 1 according to the invention, a fitting can be installed via a modified chamber A 17*c*, as depicted in FIG. 6, enabling direct installation of the device in the supply line to the gas burner. In this example gas and pressure-tight screwed connections made on the threads are used as inlet 22 and outlet 23. The device 1 according to the invention can be used universally in this embodiment as a status indicator for a gas burner and/or can be retrofitted in existing gas appliances.

The device according to the invention is not, of course, restricted to the execution examples depicted. On the contrary changes, modifications and combinations are possible without departing from the scope of the invention.

An extended field of application is therefore opened up if a relay is connected for status indication instead of the previously described circuit. Components such as a fan can be switched on and off via this relay as a function of the prevailing pressure at the burner.

LIST OF REFERENCE NUMERALS

1 Device according to the invention
1*a* Device with modified chamber A
2 Gas burner
3 Pilot gas burner
4 Gas control apparatus
5 Housing (gas control apparatus)

6 Gas inlet (bottom)
6*a* Gas inlet (side)
7 Gas outlet (side)
7*a* Gas outlet (bottom)
8 Pilot gas outlet
9 Supply line (gas burner)
10 Contact elements
10*a* Upper stop (fastenings)
11 Voltage source
12 LED (operating status of gas burner)
12*a* LED (operating status of pilot gas burner)
13 Supply line (pilot gas)
14 Housing (device)
15 Disc
16 Membrane
17 Chamber A (FIG. 2 FIG. 3)
17*a* Chamber A (FIG. 4)
17*b* Chamber A (FIG. 5)
17*c* Chamber A (FIG. 6)
18 Opening
19 Chambers
20 Circuit
21 Lower stop
22 Inlet
23 Outlet
24 Start-up
Thread, conical
26 Sealing element
27 Thread, cylindrical
28 Temperature controller
29 Fitting
30 Screwed connection

The invention claimed is:

1. Device for indicating the status of a gas burner when operated with a gas control apparatus with liquid-filled temperature controller comprising: a device connected to an outlet of the gas control apparatus for the gas burner comprises a housing which has at least two interconnected gas-tight chambers, which are separated gas-tight by a membrane connected on one side to an electrically conductive component, wherein a chamber A is connected to the gas outlet of the gas control apparatus, the membrane to which the gas pressure of the gas burner is applied through an opening in the chamber A when the gas valve is open produces a stroke, wherein a chamber B in which the side of the membrane having the connected electrically conductive component is positioned closes a circuit via contact elements led outwards and suitably indicates the operating status, wherein when the gas valve is closed, the stroke of the membrane goes back to the starting position at its own spring constant, the circuit is opened and no operating status is indicated.

2. Device according to claim 1, wherein the chamber A of the housing is designed differently with two connection points to serve as a status indicator of the pilot gas on connection to the pilot gas outlet in the supply line between gas control apparatus and pilot gas burner.

3. Device according to claim 2, further comprising that the device is arranged as a fitting in the supply line between gas control apparatus and gas burner.

4. Device according to claim 1, wherein alternatively external components can be switched by connecting a relay to the contact elements.

5. Device according to claim 1, further comprising that the membrane has a spring constant that with sufficient stroke eliminates the use of a separate restoring spring to open the circuit when the gas valve of the gas control apparatus is shut.

6. Device according to claim 1, wherein a pressure setting is not necessary.

7. Device for indicating the status of a gas burner when operated with a gas control apparatus with liquid-filled temperature controller comprising: a device connected to an outlet of the gas control apparatus for the gas burner comprises a housing which has at least two interconnected chambers, which are separated gas-tight by a membrane connected on one side to an electrically conductive component, wherein a chamber A is connected to the gas outlet of the gas control apparatus, the membrane to which the gas pressure of the gas burner is applied through an opening in the chamber A when the gas valve is open produces a stroke, wherein a chamber B in which the side of the membrane having the connected electrically conductive component is positioned closes a circuit via contact elements led outwards and suitably indicates the operating status, wherein when the gas valve is closed, the stroke of the membrane goes back to the starting position at its own spring constant, the circuit is opened and no operating status is indicated wherein the chamber A of the housing is designed differently with two connection points to serve as a status indicator of the pilot gas on connection to the pilot gas outlet in the supply line between gas control apparatus and pilot gas burner.

8. Device for indicating the status of a gas burner when operated with a gas control apparatus with liquid-filled temperature controller comprising: a device connected to an outlet of the gas control apparatus for the gas burner comprises a housing which has at least two interconnected chambers, which are separated gas-tight by a membrane connected on one side to an electrically conductive component, wherein a chamber A is connected to the gas outlet of the gas control apparatus, the membrane to which the gas pressure of the gas burner is applied through an opening in the chamber A when the gas valve is open produces a stroke, wherein a chamber B in which the side of the membrane having the connected electrically conductive component is positioned closes a circuit via contact elements led outwards and suitably indicates the operating status, wherein when the gas valve is closed, the stroke of the membrane goes back to the starting position at its own spring constant, the circuit is opened and no operating status is indicated wherein alternatively external components can be switched by connecting a relay to the contact elements.

* * * * *